(12) United States Patent
Fowler et al.

(10) Patent No.: US 11,198,958 B2
(45) Date of Patent: Dec. 14, 2021

(54) METHOD AND SYSTEM FOR MAKING MICROCOILS AND PRODUCT THEREOF

(71) Applicants: CENTRE NATIONAL DE LA RECHERCHE SCIENTIFIQUE (CNRS), Paris (FR); ECOLE SUPERIEURE DE PHYSIQUE ET DE CHIMIE INDUSTRIELLES DE LA VILLE DE PARIS, Paris (FR); MCMASTER UNIVERSITY, Hamilton (CA)

(72) Inventors: Paul David Hodgkins Fowler, Fenwick (CA); Rafael Schulman, Dundas (CA); Thomas Salez, Paris (FR); Elie Raphael, Paris (FR); Karoly Jacob Theodoor Dalnoki-Veress, W. Ontario (CA)

(73) Assignees: CENTRE NATIONAL DE LA RECHERCHE SCIETIFIQUE (CNRS), Paris (FR); ECOLE SUPERIEURE DE PHYSIQUE ET DE CHIMIE INDUSTRIELLES DE LA VILLE DE PARIS, Paris (FR); MCMASTER UNIVERSITY, Ontario (CA)

( * ) Notice: Subject to any disclaimer, the term of this patent is extended or adjusted under 35 U.S.C. 154(b) by 84 days.

(21) Appl. No.: 16/615,029

(22) PCT Filed: May 19, 2017

(86) PCT No.: PCT/IB2017/001304
§ 371 (c)(1),
(2) Date: Nov. 19, 2019

(87) PCT Pub. No.: WO2018/211306
PCT Pub. Date: Nov. 22, 2018

(65) Prior Publication Data
US 2020/0102674 A1    Apr. 2, 2020

(51) Int. Cl.
*D02J 1/02* (2006.01)
*F03G 7/00* (2006.01)
(Continued)

(52) U.S. Cl.
CPC ............... *D02J 1/02* (2013.01); *F03G 7/00* (2013.01); *H01F 5/02* (2013.01); *H01F 41/04* (2013.01);
(Continued)

(58) Field of Classification Search
CPC ... F03G 7/06; D02G 3/04; D02G 3/00; D02G 1/00; D06M 23/14; D06M 23/16;
(Continued)

(56) References Cited

U.S. PATENT DOCUMENTS

2017/0067453 A1    3/2017 Elettro et al.

OTHER PUBLICATIONS

B. Roman et al, Condens. Matter 22(2010) 493101(p. 1-16). (Year: 2010).*
B. Roman et al, J. Phys.: Condens. Matter 22(2010) 493101(p. 1-16). (Year: 2010).*
(Continued)

*Primary Examiner* — Tabassom Tadayyon Eslami
(74) *Attorney, Agent, or Firm* — Nixon & Vanderhye (57) ABSTRACT

Disclosed is a method for fabricating coils including the steps of providing a liquid droplet having a diameter on length-scales ranging from hundreds of micrometers to nanometers and bringing a fiber into contact with the liquid droplet, wherein the radius of the liquid droplet is sufficiently high in comparison to the bending elastocapillary length which is defined as where E is the Young's modulus of the elastic fiber, r is the radius of the fiber and γ is the interfacial tension between the droplet and surrounding medium, so that capillary forces induce the spontaneous winding of the fiber around the droplet, to fabricate a coil with a diameter in the range from hundreds of micrometers
(Continued)

to nanometers. Also disclosed is a system for making microcoils and to the product thereof.

23 Claims, 5 Drawing Sheets

(51) Int. Cl.
*H01F 5/02* (2006.01)
*H01F 41/04* (2006.01)

(52) U.S. Cl.
CPC .... *D10B 2321/121* (2013.01); *D10B 2331/10* (2013.01); *D10B 2401/16* (2013.01)

(58) Field of Classification Search
CPC ........ H01F 41/04; H01F 41/06; H01F 41/061; H01F 41/074; D02J 1/02
See application file for complete search history.

(56) References Cited

OTHER PUBLICATIONS

Shulman et al, Soft Matter (2017), 13, 720-724. (Year: 2017).*
Roman et al., "Elasto-capillarity: deforming an elastic structure with a liquid droplet", Journal of Physics: Condensed Matter, 2010, vol. 22, No. 49.
Barkley et al., "Predicting the size of droplets produced through Laplace pressure induced snap-off", Soft Matter, 2016, pp. 7398-7404, vol. 12.
Barkley et al., "Snap-off production of monodisperse droplets", The European Physical Journal E, 2015, vol. 38, No. 138.
International Search Report and Written Opinion, dated Jan. 26, 2018, from corresponding PCT application No. PCT/IB2017/001304.
Schulman et al., "Elastocapillary bending of microfibers around liquid droplets", arXiv.org, 2016, XP080717086.
Elettro et al., "In-drop capillary spooling of spider capture thread inspires hybrid fibers with mixed solid-liquid mechanical properties", PNAS, 2016, pp. 6143-6147, vol. 113, No. 22.

* cited by examiner

METHOD AND SYSTEM FOR MAKING MICROCOILS AND PRODUCT THEREOF

FIELD OF THE INVENTION

The present application relates to a method and a system for manufacturing coils at small length scales which involves winding a flexible fiber around a liquid droplet such that the coils or windings have a diameter within the range of micrometres to nanometres. The present application further relates to the products and materials obtained by this method and this system.

BACKGROUND OF THE INVENTION

Coils are the fundamental building blocks of inductors and serve an integral role in many technical fields as well as countless devices and technologies including cellular telephones, electromagnetic generators, sensors, memory storage and voltage control in microelectronic circuits. At macroscopic length-scales, coils are easily manufactured typically by mechanical winding methods. However, at the millimeter length-scale and below the millimeter length-scale, mechanical winding methods are often difficult to implement and thus the fabrication of microscopic coils can be a significant challenge.

The continuing miniaturization of devices, circuitry and electronics has driven an ongoing pursuit to develop new techniques and methods which can be used to manufacture coils at the micro and nano-scale. For example, coils wrapped around a magnetic core function as inductors in integrated circuitry. Since coiling at small-length scales can be difficult or inefficient, the incorporation of inductors into small integrated circuitry may be challenging. As such, in order to avoid either difficult processing techniques or sacrificing the large surface area required by macroscopic inductors, circuit designs may avoid inductors and instead use active circuit components to mimic the function of an inductor. In many cases this is sufficient but circuits with simulated inductors may exhibit undesirable effects such as increased signal noise. Furthermore, simulated inductors often do not produce the same magnetic fields as true inductors which limits their ability to function as sensors for example.

To address some of these challenges, mechanisms to miniaturize coils and devices that act as inductors have been developed using standard techniques for the fabrication of integrated circuits such as two-dimensional layer-by-layer deposition and selective etching.

There remains an outstanding need for an efficient method that allows for the fabrication of coils at small length-scales in three dimensions without complex manufacturing techniques such as surface chemistry modifications and chemical masking. In particular, there is a need for a method which is scalable and permits the mass manufacturing of large quantities of coils inexpensively and efficiently. Most known fabrication techniques employ mechanisms which generate coils one at a time through serial processing, which can be either expensive, inefficient or unfit for mass manufacturing.

SUMMARY OF THE INVENTION

The present invention aims to improve the state of the art and to propose a new method for making coils at small length scales, that is coils or windings having a diameter within the range of micrometres to nanometres.

For this purpose, the present invention relates to a method for fabricating coils comprising the steps of:
providing a liquid droplet having a diameter on length-scales ranging from hundreds of micrometers to nanometers and
bringing a fiber into contact with the liquid droplet,
wherein the radius of the liquid droplet is sufficiently large in comparison to the bending elastocapillary length which is defined as $L_{BC}=\sqrt{Er^3/\gamma}$ where E is the Young's modulus of the elastic fiber, r is the radius of the fiber and $\gamma$ is the interfacial tension between the droplet and surrounding medium, so that capillary forces induce the spontaneous winding of the fiber around the droplet to form a coil with a diameter in the range from hundreds of micrometers to nanometers.

In accordance with the invention "bringing a fiber into contact with the liquid droplet" means that the liquid droplet may be fixed as the fiber is moved towards the liquid droplet and brought into contact with said liquid droplet or vice versa the fiber may be fixed as the liquid droplet is moved towards the fiber and brought into contact with said fiber.

The present application presents a method of fabricating coils at small length-scales which involves the winding of a flexible fiber around a liquid droplet. As explained in more detail in the following description, the invention allows for easy manufacturing of microcoils having a diameter in the range from hundreds of micrometers to nanometers, particularly electrically conductive microcoils. Coils manufactured through this method may offer potential for use as sensors, inductors or in transmitting and receiving technologies for example. Further, the invention also permits efficient simultaneous manufacturing of large quantities of microcoils through parallel processing and thus may offer potential manufacturing advantages over existing methods.

The method herein presented relies upon the use of elastocapillary forces to deform a flexible fiber. When a liquid is in contact with an elastic material, capillary forces cause a deformation of the elastic material. For typical solids, these deformations are negligibly small, however in the case that the elastic material is highly flexible, this phenomenon which is referred to as elastocapillarity can result in significant deformations to the solid elastic material. Furthermore, although for macroscopic systems the length-scales over which elastocapillary deformations occur are typically negligible, elastocapillary effects can dominate at small-length scales.

Elastocapillarity has received significant scientific attention in recent years. In a 2010 article published by Roman and Bico ("*Elasto-capillarity: deforming an elastic structure with a liquid droplet*" B. Roman, J. Bico"), a review of elastocapillary phenomena is presented for slender structures such as lamellae, rods and sheets. In particular, Roman and Bico observe that elastocapillary forces can induce a fiber to wind around a liquid droplet. The experiments presented in their work are notably different from the methods presented here in accordance with the invention. The discussion by Roman and Bico is limited to the specific case of droplets sufficiently large (on the order of several millimetres) such that gravity cannot be neglected. Such droplets are placed in a carrier liquid which has been modified to precisely match the density of the droplet and thus the droplet is maintained in levitation within the liquid bath.

In contrast, the invention disclosed herein, does not rely upon the use of a liquid bath and is concerned with small length-scales where the effects of gravity can be neglected.

Further, Roman and Bico describe a method wherein fibers are manually fed into liquid droplets which is in contrast to the spontaneous winding mechanism described in this invention and which is not feasible for the small length-scales relevant to this application. In any case the disclosure of Roman and Bico has not yet lead to any industrial development.

The following presents the method of using elastocapillary forces in accordance with the invention to induce a flexible fiber to wind around a liquid droplet to create coils on the micrometer or nanometer length-scale. Throughout this description, examples are used to illustrate particular steps of the method and to develop an understanding of important details. One skilled in the relevant art will realize that this invention is widely applicable and does not rely upon the precise steps and material choices discussed here. The invention is not strictly limited by the summary of steps or the order in which they are presented and can indeed be practiced with varying methodologies from those outlined. Furthermore, not all of the details described are essential to the implementation of the invention and some aspects of the invention may be supplemented with additional steps to alter the outlined processes.

For a thin elastic structure such as a fiber in contact with a liquid droplet, capillary forces will cause a significant elastic deformation in the case that the radius of the droplet exceeds the elastocapillary length which is defined as $L_{BC} = \sqrt{Er^3/\gamma}$ where E is the Young's modulus of the elastic material, r is the radius of the fiber and $\gamma$ is the interfacial tension between the droplet and surrounding medium. The bending elastocapillary length which is set by balancing elastic bending energy with surface energy provides a measure of the relative importance of elastic and capillary forces.

Under certain wetting conditions, when a thin fiber is brought into contact with a liquid droplet, capillary forces may cause the fiber to wind around the surface of the droplet. If interactions between the fiber material and liquid droplet are favourable, the surface energy is reduced by winding the fiber around the surface of the droplet. However, this winding results in an energetic cost associated with the elastic bending of the fiber. If the reduction in surface energy during winding is greater than the energetic cost of bending, the winding process will occur spontaneously in order to minimize the energy of the system. The condition for winding depends upon the ratio of the radius of the droplet to the bending elastocapillary length. Spontaneous winding occurs in the case that $R > \alpha L_{BC}$ where R is the radius of the liquid droplet and $\alpha$ is a numerical factor which is dependent upon the wetting geometry of the system.

Thus one aspect of the invention pertains to the process of using elastocapillary forces to induce a thin fiber to spontaneously wind around the surface of a liquid droplet with a radius on the order of micrometers or nanometers thus creating a small length-scale coil consisting of a fiber wound around a liquid droplet. The process involves applying a mechanism for spontaneously winding the fiber around the droplet which includes the steps of:

providing a liquid droplet;
  bringing a fiber into contact with the liquid droplet or vice versa;
  selecting an appropriate choice of fiber material, liquid droplet material, fiber radius and liquid droplet radius such that a spontaneous winding criterion is satisfied: $R > \alpha L_{BC}$ where R is the radius of the liquid droplet, $\alpha$ is a numerical factor which is dependent upon the wetting geometry of the system and $L_{BC}$ is the bending elastocapillary length.

According to a preferential feature, the method in accordance with the invention further comprises a preliminary step of determining the numerical factor $\alpha$, which depends on the wetting parameters of the system, to define the minimum radius R of the liquid droplet which meets the relation $R > \alpha L_{BC}$ and allows for spontaneous winding of the fiber around the droplet.

In one example embodiment, a styrene-isoprene-styrene tri block-copolymer (SIS) fiber of radius 10 µm is wound around a glycerol droplet of radius 700 µm. In some embodiments the fiber material used can be a glassy polymer for example polystyrene (PS), poly(methyl methacrylate) (PMMA) or poly(n-butyl methacrylate). In other embodiments, the fiber material may be elastomeric for example Elastollan® (BASF), Estane® (Lubrizol Advanced Materials, Inc), polyester based thermoplastic polyurethane (TPU) or polyether-based TPU. In some other embodiments, the fiber material may be carbon nanotubes. In still other embodiments the fiber material may be metallic nanowire with a radius on the order of nanometers to hundreds of nanometers. The fiber material may be also a combination of the above materials. Further, the fiber material can be chosen to be electrically conductive or an electrically conductive fiber may be fabricated, for example with an electrically conductive layer, with a possible external electrically isolating layer.

The liquid droplet material may be water, glycerol, mineral oil, silicone oil, a polymeric liquid (polystyrene, poly(methyl methacrylate), polyethylene glycol), a ferrofluid or combinations thereof for example.

The spontaneous winding process can be applied to various geometries and systems. For example, in some embodiments, a syringe is filled with the droplet material of choice and connected to a thin glass pipette with a radius of about 10 µm. Pumping fluid through the syringe and out of the tip of the pipette creates a small liquid droplet at the end of the pipette whose radius can be precisely controlled through the action of the syringe. A fiber is then brought into contact with the droplet such that one end of the fiber is preferably anchored to a support while the other end is free to move. The radius of the droplet is increased until the winding criterion is met at which point the fiber winds around the droplet.

In another example, a taut fiber is suspended across two supports. A droplet of the desired size is then deposited onto the surface of the taut fiber by for example extruding liquid through a thin pipette and onto the surface of the fiber. The two supports across which the fiber is suspended are slowly brought together to introduce slack into the fiber. Once the fiber is sufficiently slack it will begin spontaneously winding around the droplet after which further increasing the slack allows the fiber to wind around the liquid droplet additional times. Optionally the two ends of the fiber may be free, when the fiber is brought into contact with the liquid droplet.

In general, provided the winding criterion is satisfied and there is sufficient slack in the fiber to facilitate winding, the winding mechanism may be applied in varying geometries, in cases wherein the fiber has zero, one or two free ends and in both the cases where the fiber is brought into contact with the droplet and vice versa. Further, the winding mechanism allows for the fabrication of coils consisting of multiple winds of fiber around the liquid droplet.

Furthermore, after winding, additional steps may be applied to either remove the liquid droplet thus isolating the coil or to solidify the liquid droplet.

Another aspect of the invention pertains to the process of after winding, isolating the fiber from the droplet and the product thereby obtained. Removal of the droplet after winding creates an isolated coil whose radius is that of the liquid droplet it was formerly wound around. The process of removing the liquid droplet may include one or more of the following steps: wicking away the droplet from the fiber for example through capillary action; allowing the droplet to evaporate in ambient conditions or accelerating evaporation with the application of heat or otherwise; exposing the fiber wound droplet to a selective solvent which dissolves the droplet material while leaving the fiber intact, or combinations thereof. In an advantageous embodiment, an electrically conductive fiber is wound around a liquid droplet multiple times and the coil subsequently isolated by removal of the liquid droplet, thus leaving a conductive coil which possess inductive properties. Such an implementation of the winding mechanism therefore permits the fabrication of small length-scale inductive coils.

Another aspect of the invention pertains to the process of solidifying the liquid droplet after winding and the products thereby obtained. After applying the winding mechanism with an appropriate choice of liquid droplet material, it is possible to solidify the liquid droplet through various means depending upon the material properties of the droplet to thus create a coil wrapped around a solid droplet. The process of solidifying the droplet may include one or more of the following steps: altering the temperature of the droplet material to induce crystallization thereby freezing the droplet, or the formation of a glassy material by reducing the temperature below the glass transition; applying UV radiation or heat to cross-link a polymeric droplet material. The process of solidifying the droplet may also include the step of curing the liquid droplet such that the droplet solidifies and/or combinations of the above steps. For example, in the case where an electrically conductive fiber is wound around a ferrofluidic droplet and the droplet is subsequently solidified through the discussed mechanisms or otherwise, the resulting product is thus comprised of a conductive coil wound around a magnetic core, which greatly enhances the inductive properties of the coil. Such an embodiment is advantageous since it allows the fabrication of micrometer or nanometer scale inductors through the application of the winding mechanism and subsequent solidification of the droplet material.

Another aspect of the present application pertains to the use of the spontaneous winding mechanism to simultaneously fabricate a plurality of fiber wound droplets and the material thereby obtained. Methods for making a plurality of coils simultaneously include providing a plurality of liquid droplets. In one example embodiment, many droplets are deposited onto a taut fiber and as the fiber is slackened it winds around the liquid droplets, thus forming a series of connected fiber wound droplets. Further, following the application of the winding mechanism to fabricate a plurality of fiber wound droplets, steps may be applied to either: 1) remove the liquid droplets thus isolating the plurality of coils through the application of the coil isolation processes previously described or 2) solidify the droplets thus forming a plurality of fibers wound around solid spherical cores through the application of the droplet solidification methods previously described.

Another aspect of the invention pertains to the method of using the spontaneous winding mechanism to simultaneously fabricate a plurality of fiber wound droplets wherein a plurality of liquid droplets is provided in an emulsion of carrier liquid and the material thereby obtained. Fibers added to the emulsion wind around the dispersed droplets provided the spontaneous winding criterion is satisfied, thus creating an emulsion of fiber wound droplets. Such an implementation of the winding mechanism offers the advantage of allowing for the simultaneous fabrication of large quantities of fiber wound droplets to which numerous post-processing techniques can be applied. In the case where a carrier liquid is used, this will modify the wetting properties (interfacial tensions), and hence modify the value of $\alpha$.

In accordance with the invention the carrier liquid may be chosen from one of the following materials: water, glycerol, toluene, ethanol, silicone oil, methanol, acetone.

Following the fabrication of an emulsion of fiber wound droplets, further steps may be applied to the method to isolate certain components of the material or to alter material properties. Firstly, the dispersed droplets may be solidified thus resulting in an emulsion of fibers wound around solid spheres wherein the process of droplet solidification may include one of: applying heat or UV radiation to cross-link a dispersed droplet material; altering the temperature of the emulsion of fiber wound droplets to freeze/solidify the dispersed droplet material; cool below the glass transition of the dispersed droplets to solidify the droplets. For example, in some embodiments the dispersed phase of the emulsion consists of a polymeric material which cross-links upon exposure to UV radiation or heat such as crosslinkable poly(dimethyl siloxane) (PDMS). Therefore, after adding fibers to the emulsion and allowing them to wind around the dispersed droplets, the emulsion of fiber wound droplets may be exposed to UV radiation or heat to induce cross-linking and thus solidification of the droplet material. The resulting product is an emulsion of coils wound around solidified droplets.

Alternatively, the emulsion may be destabilized to separate the dispersed droplets from the fiber material thus forming a dispersion of coils in the carrier liquid. The step of destabilizing the emulsion may include the following: altering the temperature of the emulsion; adding chemical demulsifier agents to induce phase separation of the emulsion; adding solvent which selectively dissolves the dispersed droplets while leaving the fiber material intact; mechanical agitation of the emulsion through centrifugation or vibration; or combinations of the above steps.

Further, fiber wound droplets, coils wound around solidified droplets or coils which have been separated from liquid droplets may be isolated from the emulsion wherein the isolation procedures may contain one of the following steps or combinations thereof: allowing the carrier liquid to evaporate; applying filtration mechanisms to the carrier liquid; adding chemical agents or depletants which cause precipitation or concentration of the dispersed droplets. In an illustrative example an emulsion of fiber wound droplets is created where the carrier liquid is chosen to be a volatile solvent and the dispersed phase a material which can be solidified through exposure to heat such as a crosslinkable PDMS. Fibers added to the emulsion wind around the dispersed droplets. Next, heat is applied to cross-link and solidify the droplet material and the carrier liquid is subsequently allowed to completely evaporate, a process which is accelerated through the application of heat. Upon complete evaporation of the carrier liquid, a plurality of solidified PDMS spheres wound with fiber is obtained. Such an implementation offers the advantage of facilitating the simultaneous parallel fabrication of large quantities of microscopic coils and thus may offer benefits as a manufacturing technique.

In particular, in one advantageous embodiment, a monodisperse emulsion of ferrofluidic droplets is dispersed in a carrier liquid. A plurality of electrically conductive fibers with a length several times the circumference of the dispersed droplets and a radius which satisfies the spontaneous winding criterion are added to the emulsion and thus wind around the dispersed droplets. The ferrofluidic droplets are solidified and the plurality of conductive coils wound around solid magnetic cores is isolated from the emulsion. Such an implementation simultaneously produces large quantities of conductive coils which possess inductive properties and is therefore advantageous as a mechanism to mass manufacture microscopic inductive coils.

Another aspect of the application pertains to, following the fabrication of an emulsion of fiber wound droplets, the material obtained upon solidification of the carrier liquid. Solidification of the carrier liquid may involve altering the temperature of the emulsion; the application of UV radiation or heat; cross-linking a polymeric carrier liquid or combinations thereof. Solidification of the carrier liquid may also involve curing the carrier, cooling the carrier liquid to induce a phase transition (crystallization of glass transition) or combinations thereof. Furthermore, the steps to solidify the carrier liquid may be implemented after the dispersed droplets are solidified through the mechanisms previously described. Solidification of the carrier liquid results in a new solid material with a plurality of fiber wound droplets embedded within. Depending upon the choice of carrier liquid, the resulting solid material may be glassy, elastomeric, or crystalline for example. Furthermore, the physical properties of the resulting material, such as the modulus, can be controlled by adjusting parameters during the solidification process or the carrier liquid.

The present invention relates also to a system for implementing the above method, comprising:
  means for providing at least a liquid droplet having a diameter on length-scales ranging from hundreds of micrometers to nanometers and
  means for bringing a fiber into contact with the liquid droplet, wherein the radius of the liquid droplet is sufficiently large in comparison to the bending elastocapillary length which is defined as $L_{BC}=\sqrt{Er^3/\gamma}$ where E is the Young's modulus of the elastic fiber, r is the radius of the fiber and $\gamma$ is the interfacial tension between the droplet and surrounding medium, so that elastocapillary forces induce the spontaneous winding of the fiber around the droplet to thus create a coil with a diameter in the range from hundreds of micrometers to nanometers.

The present invention relates also to the coil obtained by implementing the above method and/or system.
  According to preferential features of said coil
  the coil is wound and supported on a droplet;
  the coil is electrically conductive;
  the coil comprises a plurality of windings;
  the fiber material is chosen in the group comprising: a glassy polymeric material such as polystyrene, poly (methyl methacrylate) or poly-(n-butyl)methacrylate); an elastomeric material such as Elastollan®, Estane®, styrene-isoprene-styrene (SIS), polyester based thermoplastic polyurethane or polyether-based material; carbon nanotubes; metallic wire; or combinations thereof.

It is to be further emphasized that the scope of this invention encompasses an extensive combination of possible material choices and the claims described are widely applicable and not limited by the precise examples or details presented here.

BRIEF DESCRIPTION OF THE DRAWINGS

Additional and other objects, features and advantages of the invention will become apparent from the description set forth hereinafter when considered in conjunction with the accompanying drawings, in which:

FIG. 1 is a flow chart of the method in accordance with the invention, more precisely

DETAILED DESCRIPTION OF EMBODIMENTS OF THE INVENTION

The present application proposes a method for making coils having a diameter on length scales ranging from the nanometer scale up to scales of hundreds of μm by inducing a fiber to spontaneously wind around a liquid droplet through elastocapillary interactions between the droplet and fiber.

In particular, the inventors have determined that fibers spontaneously wind around droplets given that the condition $R>\alpha L_{BC}$ is satisfied, where R is the radius of the liquid droplet, $\alpha$ is a numerical factor which is dependent upon the wetting geometry of the system and $L_{BC}$ is the bending elastocapillary length. The bending elastocapillary length is defined as $L_{BC}=\sqrt{Er^3/\gamma}$ where E is the Young's modulus of the fiber material, r is the radius of the fiber and $\gamma$ is the liquid-air surface tension of the droplet.

For a given fiber material and radius, there is a critical droplet radius required for winding which can be expressed as $R_{crit}=\alpha L_{BC}$, above which the fibers will spontaneously wind around the droplet. For a given system, the empirical measurement of the minimum droplet radius can be used to calculate $\alpha$ and provide a fully determined quantitative condition for spontaneous winding of a fiber around a liquid droplet, as shown schematically in FIG. 1A.

Figure 1A:
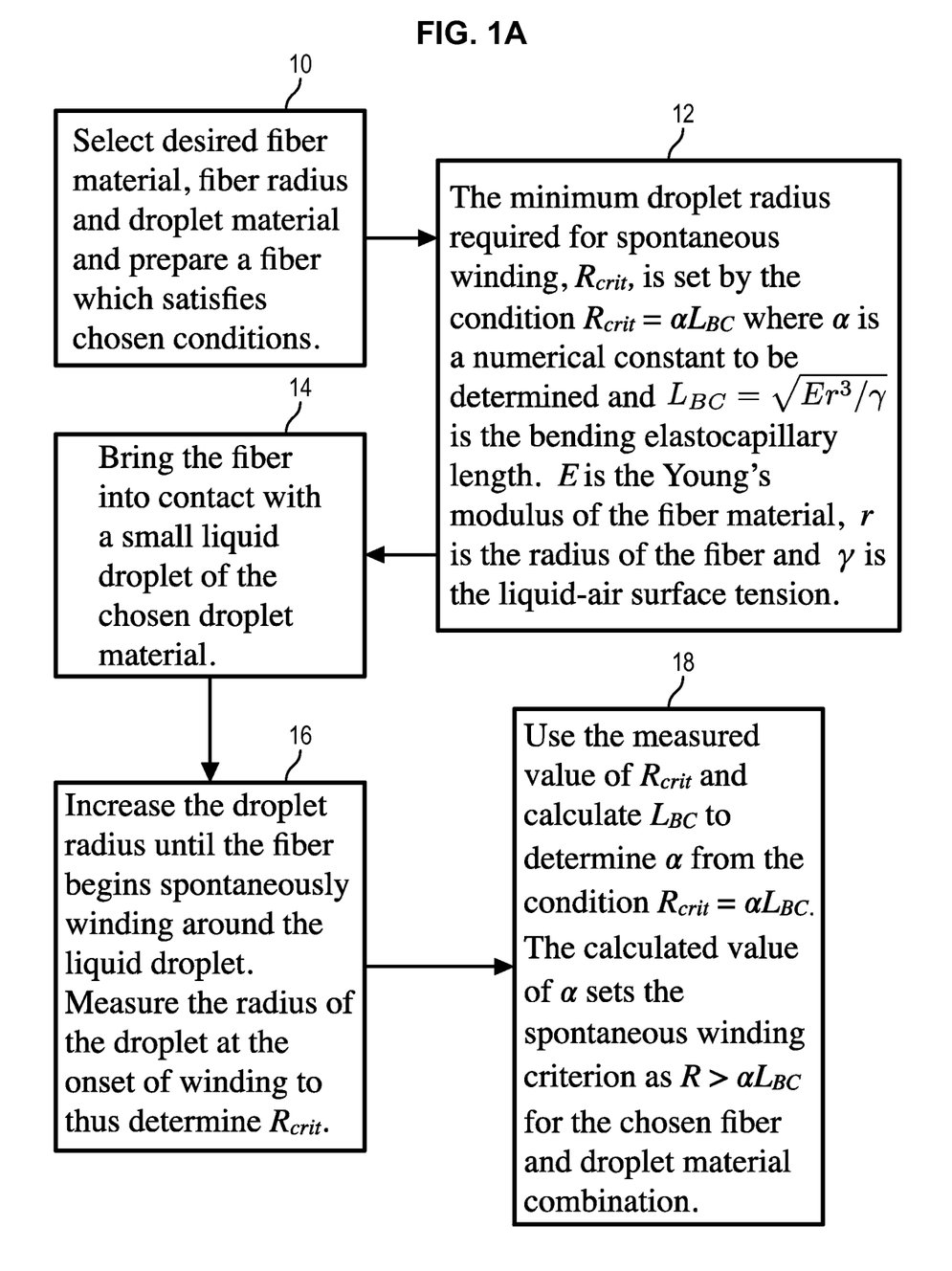
FIG. 1A illustrates the steps of preliminary application of the spontaneous winding mechanism to determine the quantitative spontaneous winding condition in accordance with the invention and FIG. 1B illustrates the basic steps of the method in accordance with the invention to fabricate fiber wound droplets applying said spontaneous winding condition.

More precisely FIG. 1A illustrates a preliminary procedure for determining α which comprises the following steps:

- a first step 10 consisting of selecting desired fiber material, fiber radius r and droplet material and preparing a fiber 30 which satisfies chosen conditions.
- a second step 12 consisting of setting the minimum droplet radius $R_{crit}$ required for spontaneous winding, by the condition $R_{crit}=\alpha L_{BC}$.
- a third step 14 consisting of bringing the fiber 30 into contact with a small liquid droplet 40 of the chosen droplet material.
- a fourth step 16 consisting of increasing the droplet radius until the fiber 30 begins spontaneously winding around the liquid droplet 40 and measuring the radius R of the droplet at the onset of winding to thus determine $R_{crit}$.
- a fifth step 18 consisting of using the measured value of $R_{crit}$ and calculating $L_{BC}$ to determine α from the condition $R_{crit}=\alpha L_{BC}$ so that the calculated value of α fully determines the spontaneous winding criterion as $R>\alpha L_{BC}$ for the chosen fiber and droplet material combination.

Figure 1B:
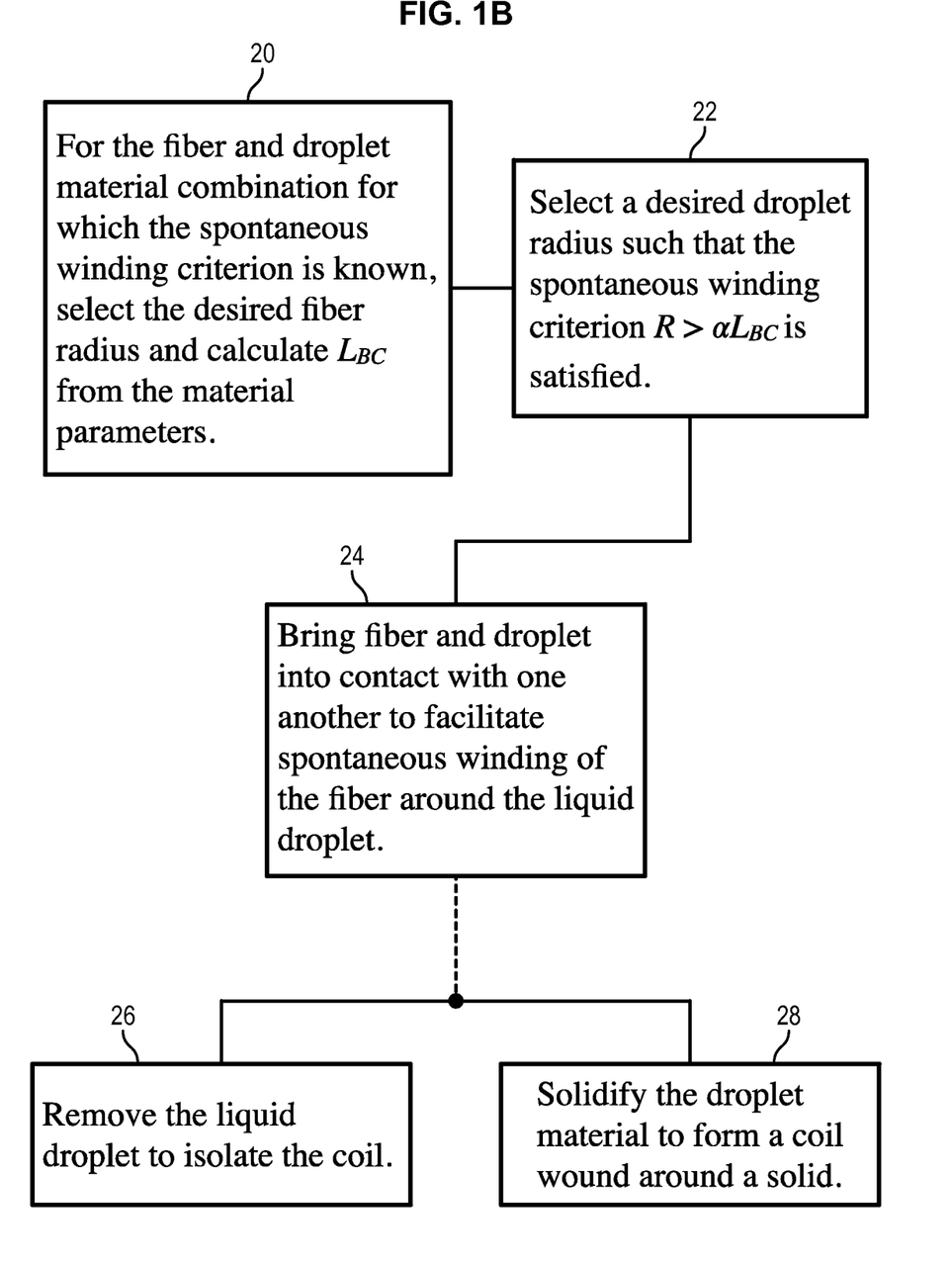

Such a fully determined condition $R>\alpha L_{BC}$ thus enables the selection of material parameters which facilitate winding, as shown schematically in FIG. 1B.

Said FIG. 1B illustrates the following sequence of steps:

- a first step 20 consisting, for the fiber and droplet material combination for which the spontaneous winding criterion is known, of selecting the desired fiber radius r and to calculating $L_{BC}$ from the material parameters.
- a second step 22 consisting of selecting a desired droplet radius R such that the spontaneous winding criterion $R>\alpha L_{BC}$ is satisfied.
- a third step 24 consisting of bringing fiber 30 and droplet 40 into contact with one another to facilitate spontaneous winding of the fiber 30 around the liquid droplet 40.

Optionally as illustrated in FIG. 1B the above method in accordance with the invention may also comprise the subsequent step of:

removing the liquid droplet 40 to isolate the coil 32 or solidifying the droplet material to form a coil 32 wound around a solid core.

Thus, one aspect of the winding mechanism in accordance with the invention pertains to the determination of the spontaneous winding criteria as illustrated in FIG. 1A, while a second aspect of the winding mechanism pertains to the selection of fiber and droplet properties which satisfy the winding criterion as illustrated in FIG. 1B.

To further explain the technical details of these two aspects of the invention, a detailed description of some embodiments in accordance with the invention is presented with reference to the accompanying figures. The particular embodiments described are not intended to limit the scope of the claimed invention and the invention can be practiced with numerous other variations and materials.

The major steps for determining the critical winding criteria are presented in the following in reference to embodiments consisting of PS fiber and glycerol droplets. An example embodiment is shown schematically in FIG. 3.

Fabrication of Fibers 30.

Figure 3:
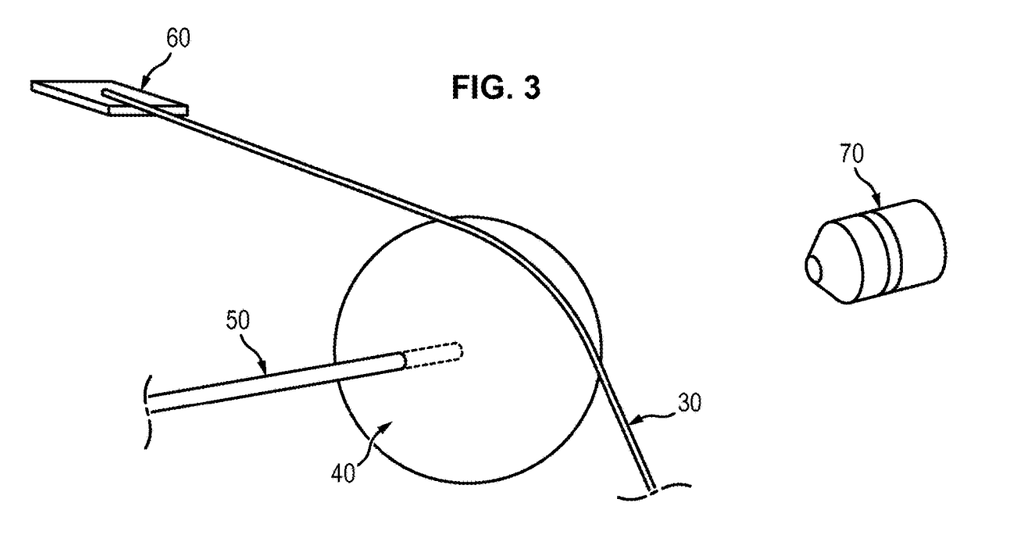
FIG. 3 is a schematic diagram showing the winding of a polystyrene (PS) fiber around a liquid droplet, in accordance with the invention.

Fibers 30 of polystyrene (PS) with a molecular weight of 25 kg/mol are formed by first depositing PS onto the surface of a hot stage held at 170° C. such that the PS forms a viscous melt. A micropipette is dipped into the melt and rapidly extracted resulting in fibers 30 with radii r on the order of 1 to 10 micrometers and lengths of tens of centimeters. Alternatively, the fiber material is dissolved in a volatile solvent to form a viscous solution and fibers are pulled from the solution by inserting and rapidly withdrawing a micropipette. The two ends of the fiber are fixed to supports 60 which for the example embodiment depicted in FIG. 3 is facilitated by taping the fiber ends to supports 60. The supports 60 are adjusted such that the fiber 30 is taut.

Fabrication of Droplets 40.

Liquid glycerol is extruded through a syringe connected to a micropipette 50 to supply a pendant glycerol droplet 40 which is supported by the tip of the pipette 50. The precise size of the droplet 40 is controlled through the action of the syringe 50. Initially the size of the glycerol droplet 40 is small.

Contact Between the Fiber 30 and the Droplet 40.

The fiber 30 is brought into contact with the pendant glycerol droplet 40 (for that the fiber 30 is displaced towards the fixed droplet 40 or vice versa the droplet 40 is displaced towards the fixed fiber 30) and then the fiber 30 is cut close to one of the supports 60, thus freeing one end of the fiber 30 and eliminating the tension. Once the fiber 30 is in contact with the droplet 40, glycerol is gradually pumped through the syringe 50 to increase the radius of the droplet 40. Once the radius of the droplet 40 is sufficiently large, the PS fiber 30 spontaneously winds around the liquid droplet 40. The precise radius at which the fiber 30 begins winding is measured and determines the condition $R_{crit}=\alpha L_{BC}$. Since the material properties are known, the measurement of $R_{crit}$ is used to determine α and thus provides a fully quantitative spontaneous winding criterion. The schematic methodology is illustrated in FIG. 1A previously described wherein reference 70 corresponds to an optical microscope for observing the droplet 40 and measuring the threshold radius $R_{crit}$.

In general, the parameters of spontaneous winding can be determined through such steps so that a quantitative condition for winding is fully determined. For specific embodiments consisting of PS fiber material and glycerol droplets, α=0.34 thus giving the spontaneous winding criterion: $R>0.34L_{BC}$. For specific embodiments consisting of SIS fibers and glycerol droplets α–0.57. The fully determined spontaneous winding condition allows for the selection of physical properties which satisfy the criteria.

An example application of the spontaneous winding mechanism is now described with reference to the embodiment consisting of an SIS fiber wound around a glycerol droplet shown in FIGS. 2, 4 and 6.

Figure 2:
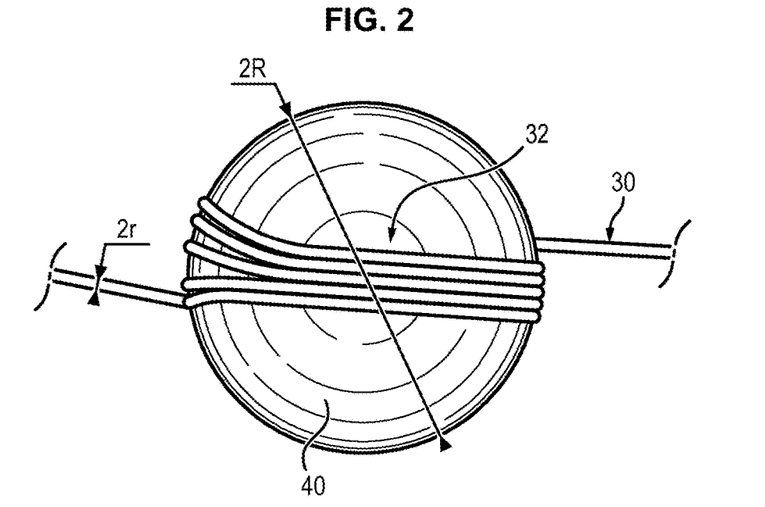
FIG. 2 is an optical microscopy image of a styrene-isoprene-styrene tri block-copolymer (SIS) fiber wound around a glycerol droplet, in accordance with the invention.

FIG. 2 illustrates a styrene-isoprene-styrene tri blockcopolymer (SIS) fiber 30 having a radius r wound with 5 windings around a glycerol droplet 40 having a radius R, in accordance with the invention.

Fibers 30 of SIS are obtained by dissolving SIS in toluene to form a viscous solution and rapidly inserting and withdrawing a micropipette into the solution. The fiber 30 is suspended across two supports 60 which are pulled apart such that the fiber 30 is held taut. A droplet 40 of the desired size such that the spontaneous winding criteria for SIS and glycerol is satisfied ($R>0.57L_{BC}$) is deposited onto the taut fiber 30. The two supports 60 across which the fiber 30 is suspended are then slowly brought together to introduce slack into the fiber 30. Once the fiber 30 is sufficiently slack it begins spontaneously winding around the droplet 40, with the various successive winding stages depicted in FIG. 6A to 6F (on the first FIG. 1A the fiber 30 is just in contact with the droplet 40; on the successive FIGS. 1B to 1E the fiber 30 progressively turns around the droplet 40; and on FIG. 1F the fiber 30 makes a complete wind around the droplet 40). Further increasing the slack in the fiber 30 induces multiple winds around the glycerol droplet 40. It is noted that although it may be advantageous to have both ends of the fiber 30 anchored to supports 60 during winding, this is optional and the method of making coils 32 within the scope of the present application can be implemented in many other possible geometries.

The application of the spontaneous winding mechanism in accordance with the invention to fabricate coils 32 consisting of flexible fiber 30 wound around liquid droplets 40 is widely applicable to various possible combinations of fiber and droplet material. It is however to be noted that with the present application one can achieve coiling on length-scales as small as nanometers provided that no limitation is imposed on supplying sufficiently small droplets 40, and provided that the fibers 30 are sufficiently thin. If the winding criteria is met, winding of coils 32 will proceed spontaneously when $R > \alpha L_{BC}$.

In some embodiments, an electrically conductive fiber material is used for winding the coils 32. An example embodiment is formed by applying the winding mechanism to coil an Elastollan® fiber 30 coated in silver nanowire around a glycerol droplet 40. Elastollan® fibers 30 are pulled by dipping a micropipette into molten Elastollan® held at 235° C. on a hot stage. A pendant droplet of silver nanowire dispersed in ethanol is held at the end of a pipette and the Elastollan® fiber is pulled through the droplet to apply a thin coating of silver nanowire to the fiber 30. The coated fiber 30 is wound around a glycerol droplet 40 by bringing the fiber 30 into contact with a glycerol droplet 40 with a radius R sufficiently large such that the spontaneous winding criterion is satisfied.

Figure 7:
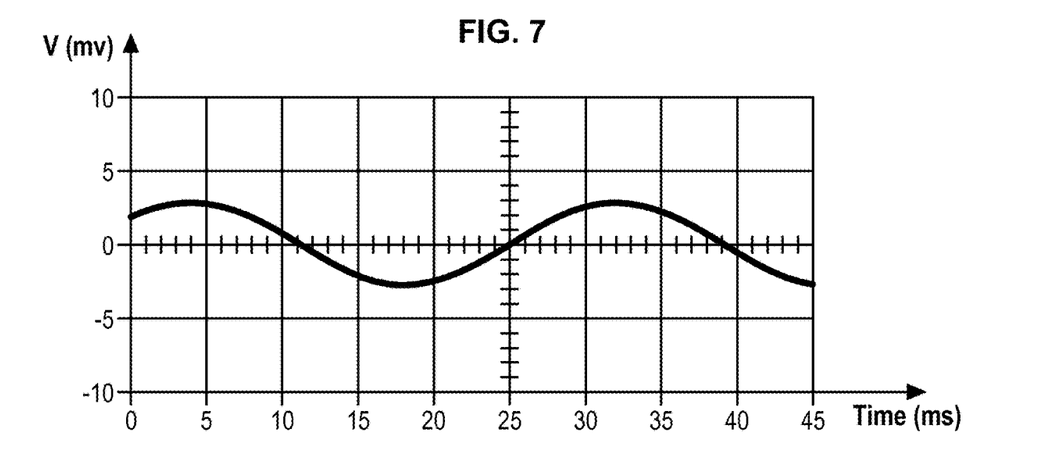
FIG. 7 is a wave-form diagram obtained from an oscilloscope showing a voltage signal induced in a conductive coil fabricated according to the present invention

To demonstrate electrical conductivity of the coil, the free ends of the fiber 30 are attached to electrical leads to create a circuit. An alternating magnetic field is generated by rotating a rare earth magnet (Neodymium) with an approximate strength of 1 tesla. This alternating magnetic field induces a current in the conductive coil 32 and a voltage which is measured with an oscilloscope. In FIG. 7 is shown the signal on the oscilloscope. The induced alternating voltage is approximately 5 mV at 36 Hz.

In some embodiments in accordance with the invention, electrically conductive fibers 30 may be formed by coating the fiber material with electrically conductive particles, such as for example silver nanoparticles or carbon nanotubes.

Further, in some embodiments in accordance with the invention, the conductive fiber 30 is coated in an external insulating layer.

Following the application of the winding mechanism to create a coil 32 wrapped around a liquid droplet 40, various operations may be performed to remove the droplet and isolate the coil (as depicted FIG. 1B step 26).

Figure 4:
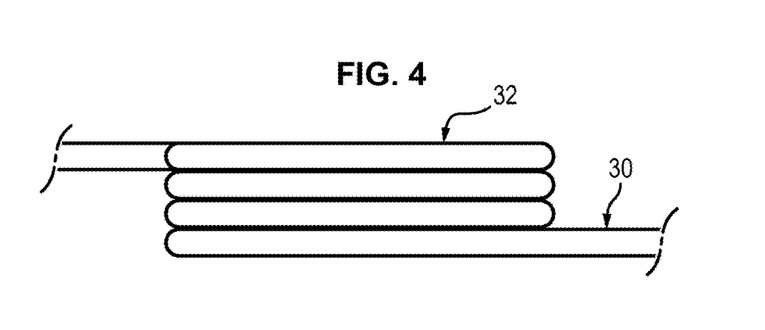
FIG. 4 is a coil of a SIS fiber which has been isolated from a liquid droplet, in accordance with the invention.

An example embodiment shown in FIG. 4 is obtained by applying the winding mechanism with a SIS fiber 30 and a glycerol droplet 40. Following winding, the fiber wound droplet is exposed to a solvent for the droplet which selectively dissolves the droplet while leaving the fiber material intact. In this case the solvent may be for example methanol which dissolves the glycerol droplet while leaving the SIS fiber intact.

It is to be noted that although the post-winding process of isolating the fiber from the liquid droplet is shown to be implemented with SIS fibers, this step may be applied to fibers made of other materials.

In other embodiments, the coil is isolated by allowing the droplet to evaporate. Particularly, heat may be applied to accelerate evaporation. Further, in some embodiments, the coil is isolated by bringing the droplet into contact with a porous material to wick the droplet through capillary action.

In some embodiments, following winding the droplet material is solidified thus creating a coil 32 wound around a solidified droplet 40 (as shown in step 28 in FIG. 1B).

An example embodiment is obtained as follows. Low molecular weight polyethylene glycol (PEG) with a crystallization temperature of $T_c \approx 25°$ C. is heated above its crystallization temperature. A pendant droplet 40 of liquid PEG is extracted and supported at the tip of a micropipette which is suspended above a hot stage held at $T > T_c$. Elastollan® fiber with a radius chosen to satisfy the spontaneous winding criterion is brought into contact with the PEG droplet thus inducing the spontaneous winding of the fiber 30 around the PEG droplet 40. The fiber wound droplet is subsequently cooled to $T < T_c$ causing the PEG droplet to crystallize and solidify.

In other embodiments, the process of solidifying the liquid droplet may include altering the temperature of the droplet. For example, applying the winding mechanism while holding a polymeric droplet at temperatures above the glass transition temperature ($T_g$) of the polymer and subsequently quenching the system to temperatures below $T_g$ results in a fiber wound around a solidified droplet. An example embodiment consisting of Elastollan® coiled around a solidified PS droplet is obtained by first bringing an Elastollan® fiber into contact with a liquid PS ($T_g \approx 100°$ C.) droplet which is held at a temperature $T > T_g$ by placing the droplet above a heating stage. The liquid droplet 40 is chosen such that the radius R satisfies the spontaneous winding criterion. Following the winding of the Elastollan® fiber 30 around the liquid PS droplet 40, the system is quenched to a temperature T<100° C. thus solidifying the PS droplet to obtain an Elastollan® coil wrapped around a solid PS core. In other embodiments, fibers 30 are wound around liquid droplets 40 which cross-link when exposed to UV light or heat such as a crosslinkable PDMS. Accordingly, the application of UV light or heat after winding induces the formation of cross-links which solidify the droplet material.

The method of applying the winding mechanism in accordance with the invention, to simultaneously make a plurality of coils or fiber wound droplets, will now be described.

In one example embodiment, many droplets are deposited onto a taut fiber suspended across two supports. The deposition of droplets may be achieved by for example manually extruding droplets from the tip of a micropipette or syringe, using an aerosol spray to dispense droplets or applying a coating to the fiber which breaks into droplets through the Plateau-Rayleigh instability. The droplets 40 are chosen such that their radius R satisfies the spontaneous winding criterion. Therefore, as the fiber 30 is slackened it winds around each of the many droplets 40 thus forming a series of coils 32 wrapped around liquid droplets 40.

Furthermore, depending on the choice of liquid droplet material, the droplets 40 may either be removed through the application of the coil isolation mechanisms herein described or the droplets 40 may be solidified through the solidification processes herein detailed.

In some embodiments, the fiber material is electrically conductive and as such the described mechanism results in a series of connected conductive coils. Further, in some embodiments, the droplets 40 are chosen to be ferrofluidic, which enhances the inductance of the coils 32.

Figure 5:
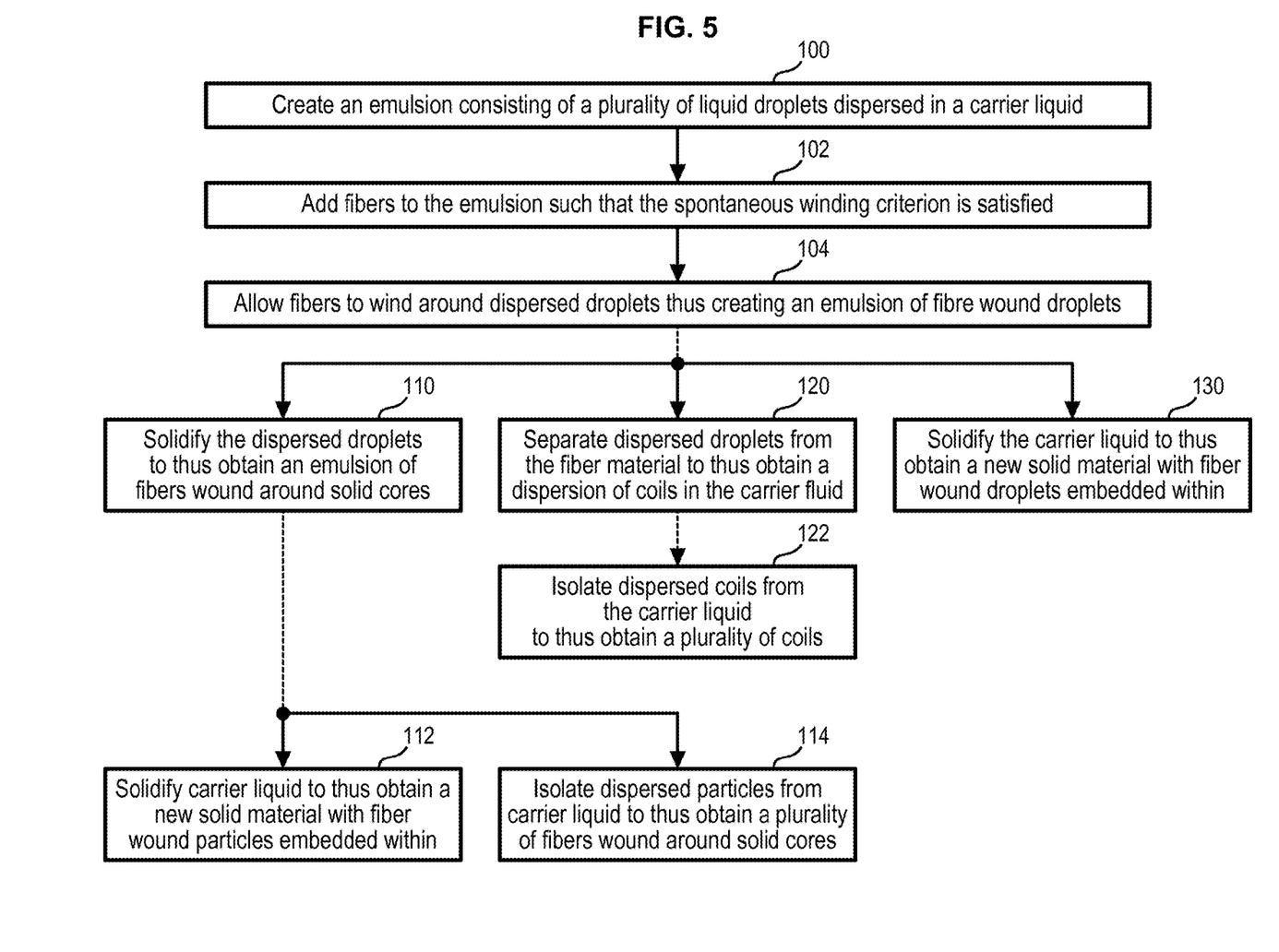
FIG. 5 is a flow chart illustrating the steps of application of the spontaneous winding mechanism to an emulsion consisting of a plurality of dispersed droplets, in accordance with the invention.
Figure 6A:
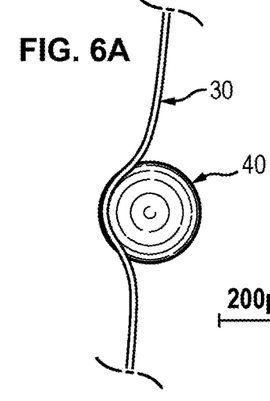
FIG. 6 is a series of optical images demonstrating the sequence of a pendant droplet of glycerol being wound with SIS fiber, in accordance with the invention.
Figure 6B:
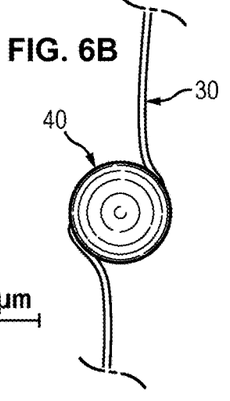
Figure 6C:
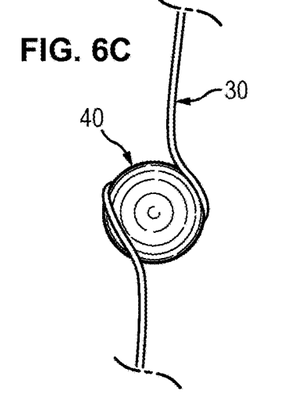
Figure 6D:
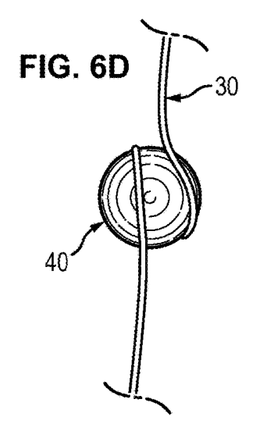
Figure 6E:
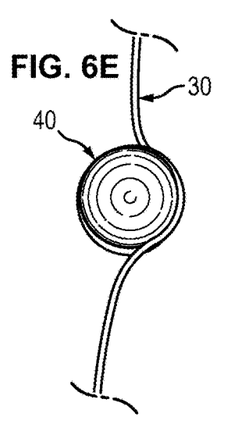
Figure 6F:
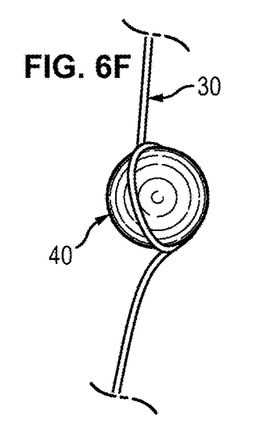

Another mechanism in accordance with the invention to create a plurality of fiber wound droplets involves an emulsion as shown in the flow chart of FIG. 5. Droplets 40 are dispersed in a carrier liquid (step 100) which can be chosen from for example, water, glycerol, ethanol, toluene or silicone oil.

The dispersed droplets 40 may be produced using standard microfluidic techniques.

In one embodiment nearly monodisperse droplets 40 are prepared using a snap-off technique (S. Barkley, S. J. Scarfe, E. R. Weeks, K. Dalnoki-Veress, Soft Matter, 12, 7398, (2016); S. Barkley, E. R. Weeks, K. Dalnoki-Veress, Euro. Phys. J. E, Tips & Tricks, 38:138, (2015)). The dispersed phase is extruded through the tip of a thin glass pipette submerged in the carrier liquid. The pipette which is prepared by heating and pulling a glass capillary with a pipette puller is attached to a syringe that is used to pump the dispersed phase through the tip of the pipette. A small amount of surfactant is added to the continuous phase to stabilize the emulsion. The dispersed phase is extruded through the tip of the pipette and into the continuous phase by applying pressure to the syringe. The action of the syringe allows for the precise control of the flow rate of the dispersed phase into the continuous phase. As fluid is pumped through the syringe and into the continuous phase, it forms a growing droplet at the tip of the submerged pipette. Surface tension causes the droplet to snap off from the pipette and enter the emulsion. The droplet size is precisely controlled by altering the flow rate, shape of the pipette tip and radius of the pipette tip.

For example, in some embodiments, emulsions of mineral oil in water are obtained through this mechanism such that the droplets have a polydispersity of less than 1 percent and can be produced to have radii on the order of a µm to hundreds of µm. It is to be emphasized that the snap-off production technique is merely one embodiment of the production of emulsions and is not limited to the case of mineral oil and water.

Following the creation of a stable emulsion, fibers are added to the emulsion (step 102) with material parameters chosen such that the spontaneous winding mechanism is satisfied: $R > \alpha L_{BC}$ where R the radius of the dispersed droplets. As discussed herein, the value of $L_{BC}$ is dependent on the balance between the bending elasticity of the fiber and the surface tension of the droplet. In the case of the emulsion, the surface energies become dependent on the interfacial tension between the two liquids.

In some embodiments, a single fiber is added to the emulsion with sufficient length such that the fiber winds around multiple droplets to thus create a plurality of fiber wound droplets connected in series.

Alternatively, a plurality of fibers may be added to the emulsion with each fiber having for example a length several times the circumference of the dispersed droplets such that the added fibers simultaneously wind around individual droplets thereby creating an emulsion of fiber wound droplets.

In some embodiments, the added fibers are electrically conductive and the dispersed phase is ferrofluidic.

Following the winding process (step 104) numerous post-processing techniques may be applied to the emulsion of fiber wound droplets as shown in FIG. 5, under respectively references 110 (plus possible steps 112 or 114), 120 (plus possible step 122) or 130.

In some embodiments, the dispersed droplets are solidified as illustrated by step 110.

For example, the dispersed phase of the emulsion may be chosen to be a liquid polymeric material which cross-links under exposure to heat or UV. Thus, the fiber wound droplets solidify upon exposure to UV or heat to produce an emulsion of fibers wound around solid cores.

In other embodiments, solidification may be facilitated by crystallizing the dispersed droplets. For example, an emulsion may be created using a dispersed phase which crystallizes in response to changes in temperature such as PEG. In such an example, the emulsion is created at elevated temperatures such that the dispersed phase is held at $T > T_c$ where $T_c$ is the crystallization temperature. Following the addition of fibers to the system to create an emulsion of fiber wound droplets, the emulsion is quenched to temperature $T < T_c$ thus inducing crystallization and solidification of the dispersed droplets.

Step 112 illustrates a first option of solidifying carrier liquid to thus obtain a new solid material with fiber wound particles embedded within, after step 110.

Step 114 illustrates a second option of isolating dispersed particles from carrier liquid to thus obtain a plurality of fibers wound around solid cores, after step 110. For example, in embodiments consisting of an emulsion of fibers wound around solidified cores, provided a volatile solvent is chosen as the carrier liquid, the dispersed fiber wound particles may be isolated by allowing the carrier liquid to evaporate. Many other approaches may be employed to isolate the fibers wound around solidified cores (step 114). One such embodiment is to utilize filtration of the solidified particles. Another embodiment exploits the use of additives which can act as a depletant to encourage the precipitation of the particles.

In some embodiments, the emulsion may be destabilized after the coils have formed, to prepare a suspension of coils in the carrier liquid. Step 120 on FIG. 5 shows schematically the separation of dispersed droplets from the fiber material to thus obtain a dispersion of coils in the carrier fluid.

For example, in some embodiments, a selective solvent which dissolves the dispersed droplets while leaving the fiber material intact is added to the emulsion of fiber wound droplets.

In other embodiments, the emulsion may be destabilized by adding a chemical demulsifier.

Alternatively, the emulsion may be destabilized by changing temperature or pH such that the carrier liquid and dispersed liquid are no longer phase-separated and readily mix.

In some embodiments, certain components of the emulsion of fiber wound droplets are isolated. Step 122 on FIG. 5 shows such an isolation of dispersed coils from the carrier liquid to thus obtain a plurality of coils 32. In some embodiments coils are isolated by allowing the carrier liquid to evaporate. Many other approaches may be taken to isolate the dispersed coils (step 122) from the carrier liquid. For example, in one such embodiment, the carrier liquid is filtered. Another embodiment involves the addition of chemical agents which cause the coils to precipitate out of the carrier liquid. Centrifugation can also be used to separate the dispersed coils from the carrier liquid.

Finally, following the creation of an emulsion of fiber wound droplets (step 104), the carrier liquid may be solidified to obtain a solid material with fiber wound droplets embedded within (step 130).

In an illustrative example embodiment, an emulsion of droplets is prepared in a carrier fluid which cross-links, and can thus be made to solidify. Fibers added to the carrier fluid wind around the dispersed droplets thereby creating an emulsion of fiber wound droplets. Next, crosslinking is initiated through the application of heat or UV for example to solidify the carrier liquid (step 130).

Alternatively, solidification of the carrier liquid can be achieved through temperature alterations taking advantage of material phase transitions such as crystallization or glass transition.

For example, the winding mechanism can be applied to an emulsion where the carrier liquid is a polymeric material held in the melt state at temperatures above its glass transition. Upon cooling the carrier liquid below the glass transition, the material solidifies and the wound fiber structure is maintained.

Typically and not restrictively, the ratio $\alpha$ is about between 0.32 and 0.38 for polystyrene (PS) fibers and about between 0.52 and 0.62 for styrene-isoprene-styrene (SIS) fibers. Moreover typically and not restrictively the radius r of the polystyrene (PS) fibers 30 is about between 2 μm and 6 μm and the radius r of the styrene-isoprene-styrene (SIS) fibers 30 about between 5 μm and 25 μm.

The inventors have namely implemented the invention with the following combinations: (a) Elastollan® fiber 30 and glycerol droplet 40, (b) SIS fiber 30 and glycerol droplet 40, (c) polystyrene fiber 30 and glycerol droplet 40, (d) Elastollan® fiber 30 and polyethylene glycol (PEG) droplet 40 above its crystallization temperature, (e) Elastollan® fiber 30 coated with silver nano-wire and glycerol droplet 40, (f) Elastollan® fiber 30 coated with silver nano-particles and glycerol droplet 40, (g) Elastollan® fiber 30 coated with carbon nano-tubes and glycerol droplet 40 and (h) Elastollan® fiber 30 coated with silver nano-particles and mineral oil droplet 40.

While the invention has been shown and described by referring to preferred specific embodiments thereof, it is to be understood that the invention is not limited to the specific form of these embodiments.

Thus it is to be emphasized that the particular embodiments illustrated and detailed are not intended to limit the scope of the invention and that many changes and modifications may be made therein without departing from the scope of the invention.

Rather, the present application focuses on the spontaneous winding criterion including the magnitude of the critical droplet radius at which spontaneous winding occurs and the implementation of the method through the appropriate selections of materials which satisfy the winding criterion. In particular, the present application is not intended to limit either the length-scales at which coils may be fabricated or the number of possible fiber/droplet combinations. Those familiar in the art to which the invention pertains will recognize that under the scope of the claimed invention, numerous other embodiments and variations are applicable.

For example in another embodiment in accordance with the invention, the coils isolated from the respective support droplets after winding or the coils wound around stabilized droplets may be embedded, after winding, into a specific additional and permanent carrier liquid. Such a specific additional and permanent carrier liquid may be made from any appropriate liquid, such as without limitation water, glycerol, toluene or ethanol. Said specific additional and permanent carrier liquid embedding the coils can be solidified with any appropriate process (using the techniques mentioned above for the carrier liquid implementing the emulsion for example) to create a solid material with isolated fiber coils or fiber wound droplets embedded within.

What is claimed is:

1. A method for fabricating coils comprising the steps of:
providing a plurality of liquid droplets in an emulsion of a carrier liquid, each of said plurality of liquid droplets having a diameter on length-scales ranging from hundreds of micrometers to nanometers and,
bringing a plurality of fibers into contact with the plurality of liquid droplets,
wherein the radius of each of the liquid droplet is larger than a critical droplet radius $R_{crit}=\alpha L_{BC}$, where $L_{BC}$ is bending elastocapillary length which is defined as $L_{BC}=\sqrt{Er^3/\gamma}$ where E is the Young's modulus of the fiber, r is the radius of the fiber and $\gamma$ is the interfacial tension between the droplet and surrounding medium, and $\alpha$ is a numerical factor depending on wetting parameters of the droplet, emulsion, fiber system, so that capillary forces induce spontaneous winding of the fiber around the droplet, to fabricate a coil with a diameter in a range from hundreds of micrometers to nanometers, and
wherein the method is adapted for making a plurality of coils simultaneously.

2. The method in accordance with claim 1 further comprising a preliminary step of determining the numerical factor $\alpha$, for defining a minimum radius R of the liquid droplet allowing winding of the fiber around the droplet which meets the following relation R>$\alpha$LBC.

3. The method according to claim 1, wherein at least one end of the fiber is anchored by a solid support when the fiber is brought into contact with the liquid droplet.

4. The method according to claim 1, wherein the two ends of the fiber are anchored by solid supports when the fiber is brought into contact with the liquid droplet.

5. The method according to claim 1, wherein the two ends of the fiber are free when the fiber is brought into contact with the liquid droplet.

6. The method according to claim 1, wherein the fiber material is chosen from the group consisting of: a glassy polymeric material, carbon nanotube, metallic wire or a combination thereof.

7. The method according to claim 1, wherein the droplet material is chosen from the group consisting of: water, glycerol, mineral oil, silicone oil, a polymeric liquid, polystyrene, poly (methyl methacrylate), polyethylene glycol, a ferrofluid or a combination thereof.

8. The method according to claim 1, herein the fiber is electrically conductive.

9. The method according to claim 1, wherein the fiber material is electrically conductive.

10. The method according to claim 1, comprising a step of coating the fiber material with an electrically conductive layer.

11. The method according to claim 1, comprising a step of coating the fiber with an external electrically isolating layer.

12. The method according to claim 1, further comprising a step of bringing the plurality of liquid droplets into contact with a single fiber.

13. The method according to claim 1 for making a plurality of coils wherein the carrier liquid is chosen from the group consisting of: water, glycerol, toluene, ethanol, silicone oil, methanol, and acetone.

14. The method according to claim 1 for making a plurality of coils simultaneously, wherein the plurality of liquid droplets is ferrofluidic.

15. The method for fabricating coils according to claim 1, which further comprises the step of isolating the coils from the liquid droplet.

16. The method for fabricating coils according to claim 1, which further comprises a step of removing the liquid droplet to isolate the coils.

17. The method for fabricating coils according to claim 16, wherein the step of removing the liquid droplet to isolate the coil includes at least one of the following steps:

wicking away the droplet from the fiber;
allowing the droplet to evaporate in ambient conditions or accelerating evaporation through the application of heat;
exposing the droplet, emulsion, fiber system to a selective solvent which dissolves the droplet material but not the fiber material;
or a combination thereof.

18. The method for fabricating coils according to claim 1, which further comprises a step of solidifying the liquid droplet.

19. The method for fabricating coils according to claim 18, wherein the step of solidifying the liquid droplet includes at least one of the following steps:
cross-linking a polymeric droplet material with UV or heat;
curing the liquid droplet such that the droplet solidifies;
cooling the droplet material to induce a phase transition resulting in solidification by crystallization or glass transition;
or a combination thereof.

20. The method for making a plurality of coils according to claim 1, which further comprises steps of isolating dispersed coils with at least one of the following steps:
allowing the carrier liquid to evaporate;
filtration of the carrier liquid;
adding chemical depletants to the carrier liquid;
centrifugation of the carrier liquid;
inducing precipitation of the dispersed coils;
or a combination thereof.

21. The method according to claim 1, which further comprises a step of isolating the coils from dispersed droplets wherein the process of isolating coils contains at least one of the following steps:
altering the temperature of the emulsion;
adding chemical demulsifier agents to induce phase separation;
adding solvent which selectively dissolves the dispersed droplets while leaving the fiber material intact;
mechanical agitation of the emulsion through centrifugation or vibration; or a combination thereof.

22. The method according to claim 1 which further comprises a step of solidifying the carrier liquid.

23. The method according to claim 22, wherein the step of solidifying the carrier liquid contains at least one of the following steps:
cross-linking the carrier liquid material with UV or heat;
curing the carrier liquid;
cooling the carrier liquid to induce a phase transition by crystallization of glass transition;
altering the temperature of the carrier liquid;
or a combination thereof.

* * * * *